April 2, 1929.  W. E. WHITNEY  1,707,699
METHOD OF AND APPARATUS FOR REGISTERING FILMS
Filed May 27, 1927  3 Sheets-Sheet 1
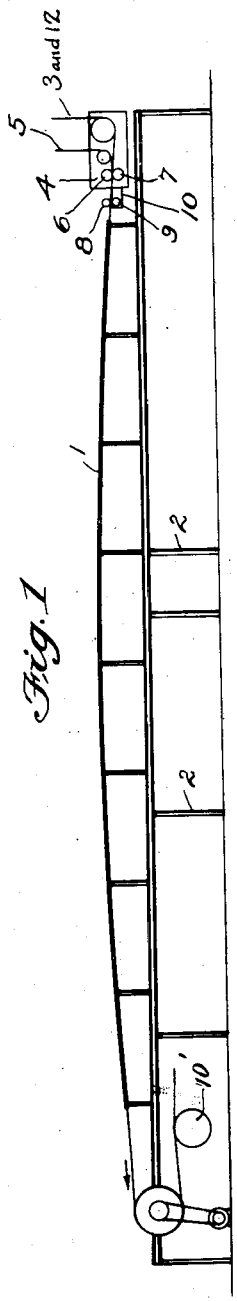
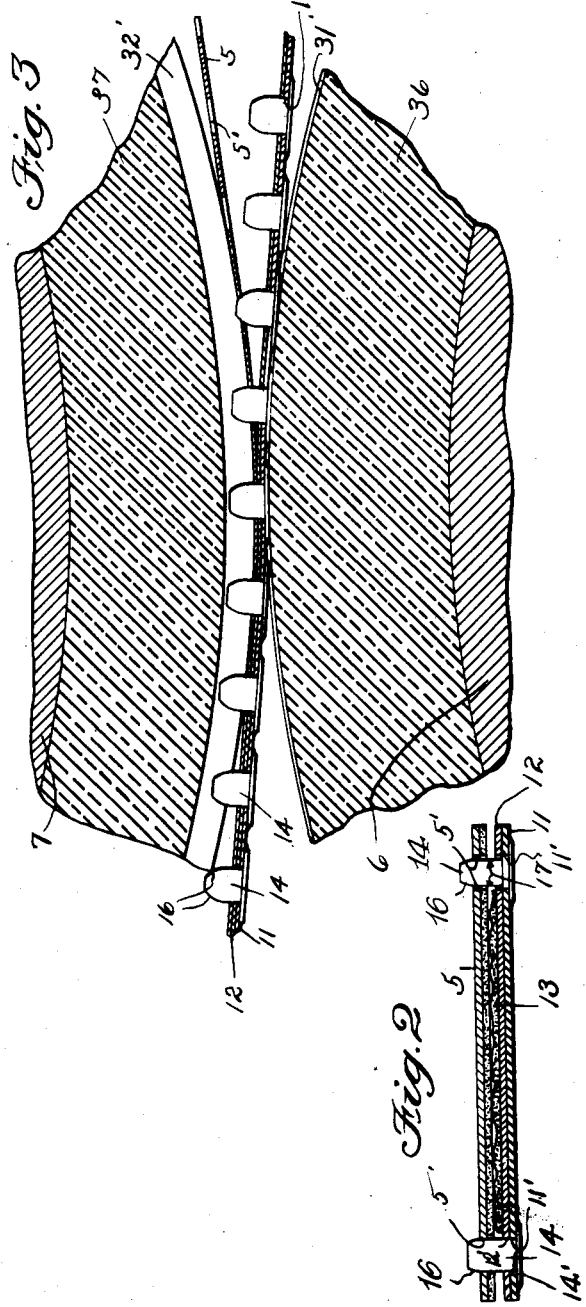
Inventor
William E. Whitney
By Roberts Cushman & Woodbury
Att'ys

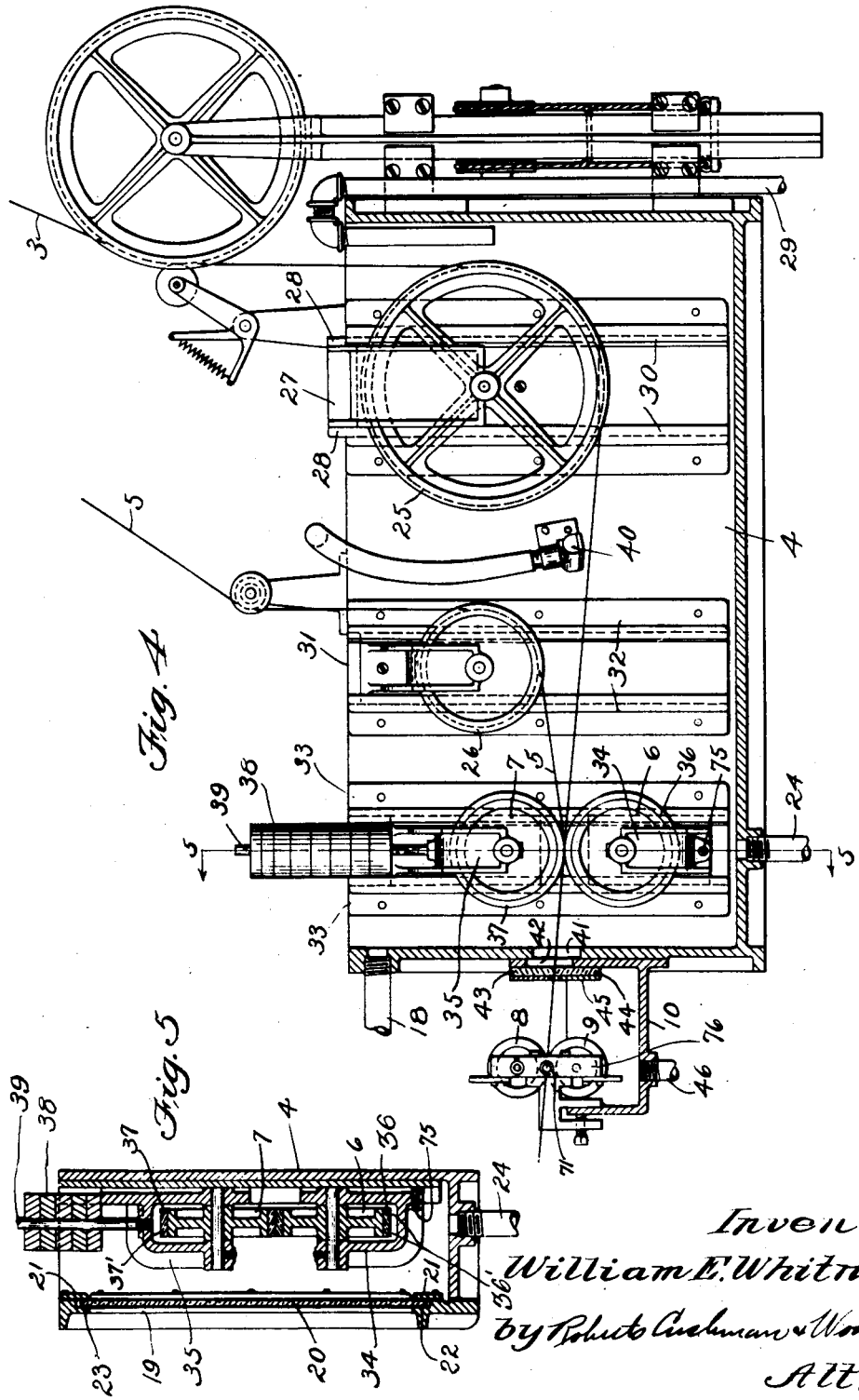

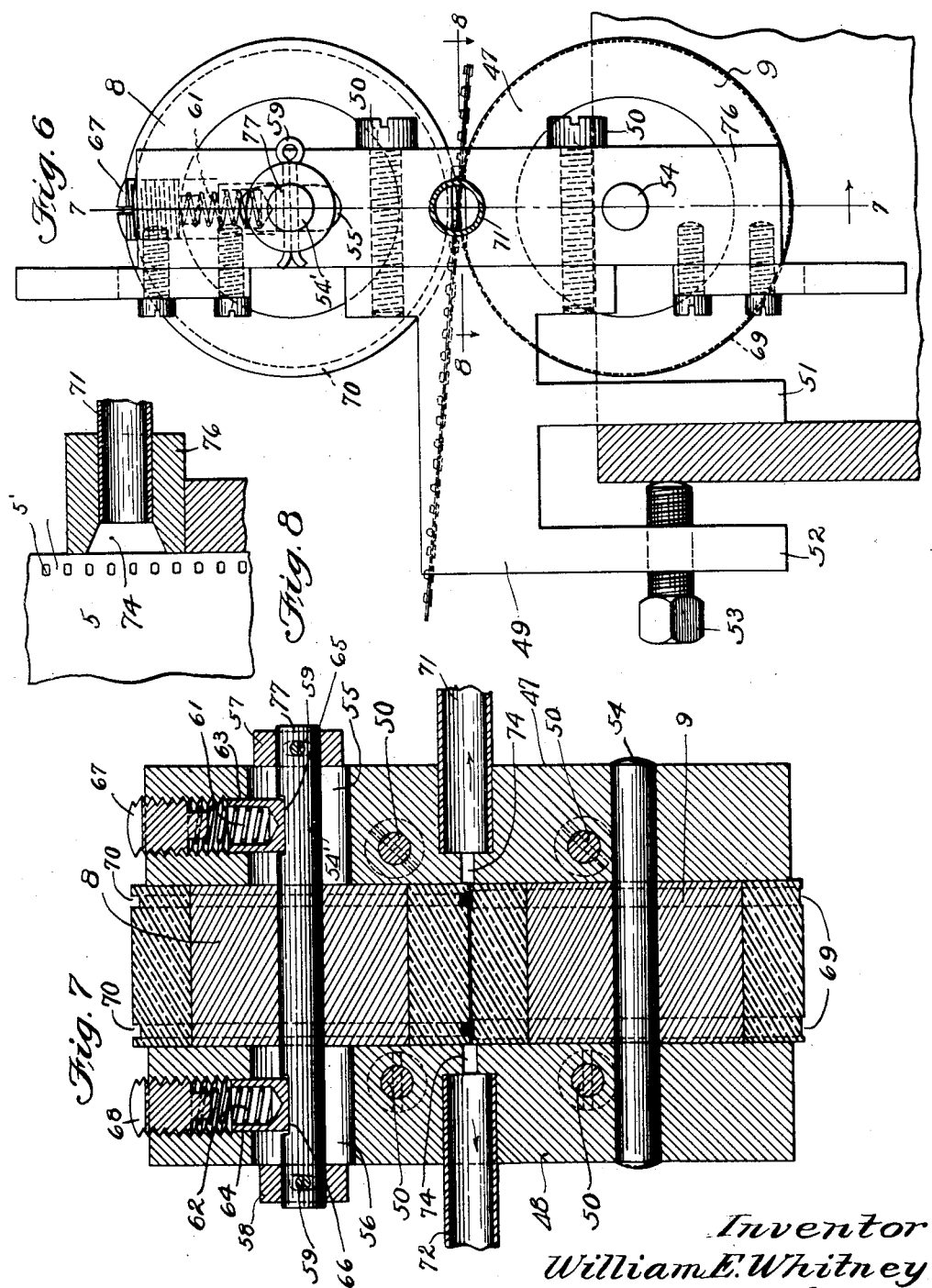

Patented Apr. 2, 1929.

1,707,699

UNITED STATES PATENT OFFICE.

WILLIAM E. WHITNEY, OF GERMANTOWN, PENNSYLVANIA, ASSIGNOR, BY MESNE ASSIGNMENTS, TO TECHNICOLOR MOTION PICTURE CORPORATION, OF BOSTON, MASSACHUSETTS, A CORPORATION OF MAINE.

METHOD OF AND APPARATUS FOR REGISTERING FILMS.

Application filed May 27, 1927. Serial No. 194,640.

This invention relates to the art of printing cinematographic films (or any other strips carrying a series of pictures whether motion or still) by imbibition, that is, by the transfer of dye or pigment from a matrix printing film or strip by face contact with a blank strip or film to be printed, and more particularly to a method and apparatus for registering two films or strips, that is bringing them into contact in accurate predetermined relationship and/or holding them in this relationship so that single pictures may be printed on a blank in accurate position relative to sprocket holes or other reference points on the blank and/or complemental parts of pictures may be printed on the blank in accurate position relative to each other.

In a broad aspect the invention involves interengaging or interlocking the films together in such manner that they are held in registered relation while traversing a long path which is preferably rectilinear, that is, approximately straight in contradistinction to a rotary path such as the face of a wheel or drum, although in the preferred form of my invention the films may travel to and from and over rollers while interlocked as well as along straight paths. The interlocking is preferably effected by pins extending through openings in the films. The pins are preferably interconnected as by a metallic band traveling with the films and the band may be fast to one of the films as, for example, a metallic backing adhering to the back of the matrix film. However in the best practical application of my invention of which I am aware they are mounted on an endless belt separate from both films (as claimed in companion application of Daniel F. Comstock, Serial Number 194,641 filed on even date herewith) with the pins or teeth adapted to fit the sprocket holes of the films or teeth in all or certain dimensions according to any known or desired system of pin registration.

In a more specific aspect the invention involves a thin band of metal or other non-extensible material, and means for engaging the films, such as projecting teeth, at uniformly spaced intervals along or adjacent to the edge of the film and forming substantially parallel rows. The band is suitably made of a width substantially equal to that of the film which it is to receive and may be provided with a series of accurately and equally spaced perforations, forming a row parallel to and spaced slightly inward from each longitudinal margin of the strip. These perforations may be spaced apart, in each row, to correspond to the marginal sprocket holes customarily provided along each side of films of this sort. The rows will also be spaced apart accurately, to correspond to the space between the parallel rows of sprocket holes in the films. Engaging means such as pins may then be pressed through the perforations in the blank and hence positioned to register with and pass through the sprocket holes in the film, thereby effecting accurate registry of the film or films with each other and with the backing strip. By inserting such means through each pair (or regularly spaced pairs) of perforations and sprocket holes along the margins of the backing and films, respectively, an accurate registry and substantially permanent engagement of the strips is effected. A convenient adaptation of the invention in actual practice is provided by permanently affixing such engaging means or pins to the perforations of the backing strip. The forward or upper ends of the engaging means or pin is also preferably tapered or rounded, to pass freely through the openings while the sides adjacent to the bottom are substantially parallel. The pins may fit the sprocket holes in both dimensions, in which case one row of pins may be dispensed with in some cases, or the pins of one row may fit longitudinally of the film and the pins of the other row transversely of the film.

A typical and representative embodiment of the invention is illustrated by the accompanying drawings, in which:

Fig. 1 is a diagram of a backing strip (which may or may not be continuous) and associated apparatus by which it is operated;

Fig. 2 is a cross-section of the backing showing two films, in superposed position thereon;

Fig. 3 is a cross-section with parts broken away, of a pair of guide rollers adapted to lead the backing and films into superposed relationship, into registry and into contact with each other;

Fig. 4 is a cross-section of means for effecting contact between the films;

Fig. 5 is a cross-section along line 5—5 of Fig. 4;

Fig. 6 is a side elevation of the guide rollers shown in part by Fig. 3;

Fig. 7 is a cross-section on line 7—7 of Fig. 6; and

Fig. 8 is a plan view of one of the lateral channels shown in Fig. 7.

In the drawings, numeral 1 indicates generally an extended path or guide supported by framework 2 and adapted to convey the backing strip 3 and film or films 5 which are brought into contact in tank 4, pass between rollers 6, 7, and after leaving the tank, between rollers, 8, 9, in chamber 10 and thence through path 1. The backing strip is returned to tank 4 while the films may be gathered, at the opposite end, upon a reel or other device 10'.

The backing strip 3 is shown as a thin sheet of metal 11 (Fig. 2) having a row of equally spaced openings 11' adjacent and parallel to the longitudinal margins, (Figs. 2 and 8) through each of which is inserted a metal tooth or pin 14 having a base 14' soldered or otherwise affixed to the under surface of the strip. Each pin is of appropriate length and has relatively parallel sides, in the portion which passes through (and tightly fits) the opening 11' in the backing strip and adjacent thereto, while the upper end is rounded or pointed as at 16.

In the arrangement shown (Figs. 2 and 3) the matrix film 12 carrying the relief or image-forming portion 13 on its upper surface lies flat against the backing, with the teeth 14 passing upwardly through the marginal sprocket holes 12' therein. The blank, gelatin coated film 5 is brought into registry with film 12, its sprocket holes 5' coming into engagement over the teeth 14, and passing thence downwardly against film 12, the margins of the sprocket holes fitting and pressing slightly against the parallel sides of the upright position 17 of the teeth 14.

Apparatus for the imbibition printing of films, which is typical of that in which the film conveying strip or backing is used, (and more fully described in copending applications of Young and L. T. Troland, filed herewith, Serial Nos. 194,642 and 194,671) is shown in Figs. 4 to 8. Thus guide or compression rollers 6, 7, are mounted in a tank 4 (Figs. 4 and 5) filled with water and provided with an overflow 18. The front of the tank is provided with a frame 19, having a glass window 20 secured by lug 21, over the bottom and top edges and pressing the same against washers 22, 23, respectively. A second drain pipe 24 is provided in the bottom of the tank for completely emptying the tank, while a supply pipe enters at 29.

The tank also contains a guide wheel 25, (for carrying the backing strip 3) mounted upon an adjustable bearing 27 having flanges 28, slidable vertically between guideways 30 upon the side of the tank. A guide wheel 26 for the film 5 is mounted upon an adjustable bearing 31 carried between the vertical guideways 32.

Compression roller 6 may be permanently positioned in the tank upon bearing 34, and is provided with a peripheral rim of rubber 36 on its face, having annular grooves 36' therein (Fig. 5) to receive the bases 14' of pins 14 on strip 3. The upper roller 7 is mounted in an adjustable bearing 35 sliding vertically in the guideways 33. The upper roller 7 is also provided with peripheral ring 37 and with slots 37' corresponding to and adapted to fit over the parallel rows of teeth 14 in the backing strip 11. The bearing 35 is provided with a series of weights 38 fitting over an upright post 39.

The tank is also fitted with a water inlet or agitator 40 adjacent to the surface of film 12 on backing strip 11 before it comes into contact with film 5.

At the end of the tank is an aperture 41 standing opposite to aperture 42 in chamber 10, which is in turn covered by a plate 43 having a slit of just sufficient size to permit the composite strip to pass therethrough. An outer plate 45 is also provided. The bottom of the chamber 10 is provided with a drain 46 to carry off such waste as may come through the slit or from the wet films.

Rollers 8 and 9, in chamber 10, are mounted between plates 47, 48 (Figs. 6 and 7) which are secured to clamping member 49 by machine screws 50 and attached to the wall of chamber 10 by projecting lugs 51 and 52 and turn bolt 53. The lower roller 9 is rotatably mounted on the fixed axis 54 while the upper roller 8 has a floating axis 54' extending through lateral apertures 55, 56 having terminal heads 57, 58 at the ends secured by cotter pins 59. In the plates 47, 48 and at right angles to the end portions of the axis passing into apertures 55, 56, respectively, are provided threaded openings having coiled springs 61, 62, therein, butting at their lower extremities against closed caps 63, 64, and tending to force the same into recesses 65, 66, formed in the axis 54', while at their upper ends they are adjustably retained by set screws 67, 68.

The periphery of lower roller 9 is provided with annular slots 69 positioned to correspond to its contact with the under portions 14' of the rows of teeth 14 on strip 11, while the upper roller 8 is provided with similar grooves 70 to receive the rows of teeth 14.

Passing through the plates 47, 48, outwardly at either side from the point of contact of the rollers 8 and 9 with the composite films and backing strip 3, 5,—are provided suction tubes 71, 72, leading from the expanded space 74 (Fig. 8) adjacent to the margins of the films to a suitable drain (not shown).

Returning now to the backing strip 11, this is fashioned from suitably resilient, thin steel, or Monel metal, or the like, preferably non-corrosive and non-rusting, and sufficiently strong to resist the mechanical strains of operating the apparatus. A strip of suitable width is first obtained and marginal rows of perforations formed therein. The teeth 14 may be made from brass wire of suitable gauge, cut to appropriate and uniform lengths and rounded at their upper ends and headed off at their lower ends, as by suitable brass-shaping machinery which may simultaneously insert the tooth through its perforation in the steel band. The expanded head is then soldered to the back surface of the steel strip, while the upper rounded head protrudes a given amount above the upper surface. The parallel, usually cylindrical or square sides 17 firmly fit into the perforation 11', and extend through the band, appreciably above its upper surface and stand perpendicular thereto.

In operation, in the apparatus shown (Fig. 4) the band 3 passes under pulley 25 and through the water contained in tank 4. The matrix film 12 is registered therewith, (or may be permanently affixed thereto) and receives the teeth 14 through the sprocket holes 12' arranged along its longitudinal margins, as indicated in Fig. 2. As the backing strip and superposed matrix film pass under water jet 40, air bubbles, solid particles or the like are removed. The strip then passes between the nip of rollers 6, 7, where it is joined by blank film 5 (see Fig. 3). As the combined strips feed between the rollers the soldered bases 14' of teeth are received in grooves 36' of the lower roller and the upwardly projecting portions are received in grooves 37' of the upper roller. This permits the rollers 6 and 7 to force the films downwardly into contact with each other, the sprocket holes engaging accurately the parallel sides 17 of the teeth on the backing strip and successively aligning the films with each other and in accordance with the fixed dimensions of the backing strip, both longitudinally and laterally, even before actual contact takes place. The resilient rubber surfaces 36 and 37 of the two rollers compress the films firmly together, and downwardly over the teeth 14 and firmly against the backing strip 3.

The strip and superposed films then pass out of the tank, through aperture 41 and between the spring pressed rollers 8 and 9, substantially all of the water thereon, being withdrawn by suction through lateral outlets 71, 72, or caught in the chamber 10. The films are then conveyed in the fixed relationship thus established, through a cycle of suitable length, as for example to permit complete imbibition of the dye from the matrix film to the blank film. The frictional engagement of the pins 14 with the margins of the sprocket holes in the films insures the continuance of this relationship without appreciable relative movement until they are separated and stripped off, which may be done readily in any obvious manner.

From the foregoing it will be evident that this unique method of interlocking the films against relative movement permits the films to be flexed while held in registered relation to each other so that they may travel to and from rollers or drums or along rectilinear paths, that is, approximately straight paths or non-rotary paths, while interlocked in registered contact.

I claim:

1. A method of imbibition printing strips of films which comprises continuously passing the film to be printed and a matrix film along a rectilinear path while interlocked against movement relatively to each other.

2. A method of imbibition printing strips of films which comprises interlocking a matrix film and a film to be printed against relative movement while permitting the films to be longitudinally flexed and continuously passing the films thus interlocked along a predetermined path.

3. Cinematographic apparatus for imbibition printing comprising means for conveying along a rectilinear path a matrix film and a film to be printed in intimate face contact with each other and means traveling with the films in interengagement therewith for holding the films against relative movement while traversing said path.

4. Cinematographic apparatus for imbibition printing comprising means for conveying along a predetermined path a matrix film and a film to be printed in intimate face contact with each other and means traveling with the films in interengagement therewith for holding the films against relative movement while permitting the films to flex longitudinally.

5. Cinematographic film apparatus, comprising a flexible strip, and registering pins distributed longitudinally thereof.

6. Cinematographic apparatus comprising a flexible strip, tapered registering pins projecting from one side of the strip, and spaced apart at regular intervals longitudinally of the margins.

7. Cinematographic apparatus comprising a flexible strip, tapered registering pins projecting from one side thereof, and a film bearing a series of pictures, affixed to said side intermediate of said pins.

8. In cinematographic apparatus, means for holding one cinematographic film in registration with a similar flexible film having sprocket holes in the margins, one film having a plurality of teeth suitably spaced for engagement with the sprocket holes in the cinematographic film.

9. Cinematographic apparatus for holding one cinematographic film in registration with another comprising a flexible band and a row of registering teeth along each of the longitudinal margins of the band to interengage with corresponding sprocket holes of the films.

10. A cinematographic apparatus for holding one cinematographic film in registration with another, said films being provided with marginal rows of sprocket holes therein comprising a flexible band, registering teeth thereon to engage the sprocket holes in the films, and means for bringing the band and films into registration at an acute angle.

11. In combination, a film conveyor comprising a backing member having regularly spaced perforations adjacent to its longitudinal margins, a film having corresponding sprocket holes along its longitudinal margins, and means including registering teeth fastened in said perforations in the backing adapted to enter the corresponding film, to register and engage the backing and the film in fixed relationship.

12. A film conveyor comprising a metallic flexible strip, and a row of evenly spaced registering teeth affixed thereto adjacent the longitudinal margins and characterized by having tapered or rounded points.

13. A film conveyor comprising a metallic flexible strip, and a row of evenly spaced registering teeth affixed thereto adjacent the longitudinal margins and characterized by having tapered or rounded points and characterized by having substantially parallel sides.

14. In the art of cinematography, the method of maintaining the distance between the sprocket holes of a film substantially equal to a fixed standard while the film is traversing a predetermined path which comprises inserting pins through the sprocket holes at recurrent intervals and while the film is traversing said path positively holding the pins in standard spaced relation longitudinally of the film while permitting the film to flex to different degrees of curvature as it traverses said path.

Signed by me at Philadelphia, Pa., this 18th day of May, 1927.

WILLIAM E. WHITNEY.